United States Patent
To et al.

(10) Patent No.: US 12,388,765 B2
(45) Date of Patent: Aug. 12, 2025

(54) TRANSMIT SIDE SCALING AND ALIGNMENT

(71) Applicant: Microsoft Technology Licensing, LLC, Redmond, WA (US)

(72) Inventors: Khoa A. To, Redmond, WA (US); Omar Cardona, Bellevue, WA (US); Dmitry Malloy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 646 days.

(21) Appl. No.: 17/809,690

(22) Filed: Jun. 29, 2022

(65) Prior Publication Data

US 2024/0007412 A1    Jan. 4, 2024

(51) Int. Cl.
G06F 9/54 (2006.01)
G06F 9/455 (2018.01)
G06F 13/38 (2006.01)
H04L 47/6295 (2022.01)

(52) U.S. Cl.
CPC ...... *H04L 47/6295* (2013.01); *G06F 9/45558* (2013.01); *G06F 9/545* (2013.01); *G06F 13/38* (2013.01); *G06F 2009/45595* (2013.01); *G06F 2209/548* (2013.01)

(58) Field of Classification Search
None
See application file for complete search history.

(56) References Cited

U.S. PATENT DOCUMENTS

| | | |
|---|---|---|
| 2009/0183180 A1 | 7/2009 | Nelson |
| 2012/0033673 A1 | 2/2012 | Goel et al. |
| 2014/0115575 A1* | 4/2014 | Chand ................ G06F 9/45558 718/1 |
| 2019/0258503 A1* | 8/2019 | Manco ...................... G06F 9/54 |
| 2021/0352663 A1* | 11/2021 | Hedayat ............ H04W 72/0446 |

FOREIGN PATENT DOCUMENTS

WO    2021070240 A1    4/2021

OTHER PUBLICATIONS

"International Search Report and Written Opinion Issued in PCT Application No. PCT/US23/022800", Mailed Date: Sep. 8, 2023, 13 Pages.

* cited by examiner

*Primary Examiner* — Craig C Dorais

(57) ABSTRACT

Examples of the present disclosure describe systems and methods for transmit side scaling. In examples, transmission side configuration information is received by a host operating system from a guest operating system, where the transmission side scaling configuration information specifies the manner in which data packets transmitted by the host operating system are to be distributed to a network interface card of the host operating system. The transmission side configuration scaling information is implemented in an outbound transmission table of the host operating system. When a data packet is received by the host operating system, the host operating system evaluates the data packet using the outbound transmission table. Based on the evaluation, that data packet is transmitted using a specified transmit queue of the network interface card.

20 Claims, 10 Drawing Sheets

TRANSMIT SIDE SCALING AND ALIGNMENT

BACKGROUND

Receive side scaling enables an operating system to specify to a network interface card the manner in which data packets received by the network interface card are to be distributed among the processors of the operating system. However, there is currently no mechanism for transmit side scaling, in which the network interface card specifies to the operating system the manner in which data packets transmitted by the operating system are to be distributed to the network interface card. Further, there is currently no mechanism to align the receive side scaling and the transmit side scaling.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for transmit side scaling. In examples, transmission side configuration information is received by a host operating system from a guest operating system, where the transmission side scaling configuration information specifies the manner in which data packets transmitted by the host operating system are to be distributed to a network interface card of the host operating system. The transmission side configuration scaling information is implemented in an outbound transmission table of the host operating system. When a data packet is received by the host operating system, the host operating system evaluates the data packet using the outbound transmission table. Based on the evaluation, that data packet is transmitted using a specified transmit queue of the network interface card.

Examples of the present disclosure further describe systems and methods for aligning receive side scaling and transmit side scaling. In examples, a host operating system constructs an inbound transmission table that comprises a mapping of data packet information to processors of the host operating system. The host operating system provides the inbound transmission table to a network interface card to be stored. When a data packet is received by the network interface card, the network interface card evaluates the data packet using the inbound transmission table. Based on the evaluation, the network interface card transmits the data packet to a specified processor of the host operating system and the data packet is transmitted using the specified processor to a corresponding transmit queue of another network interface card.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Figure 1:
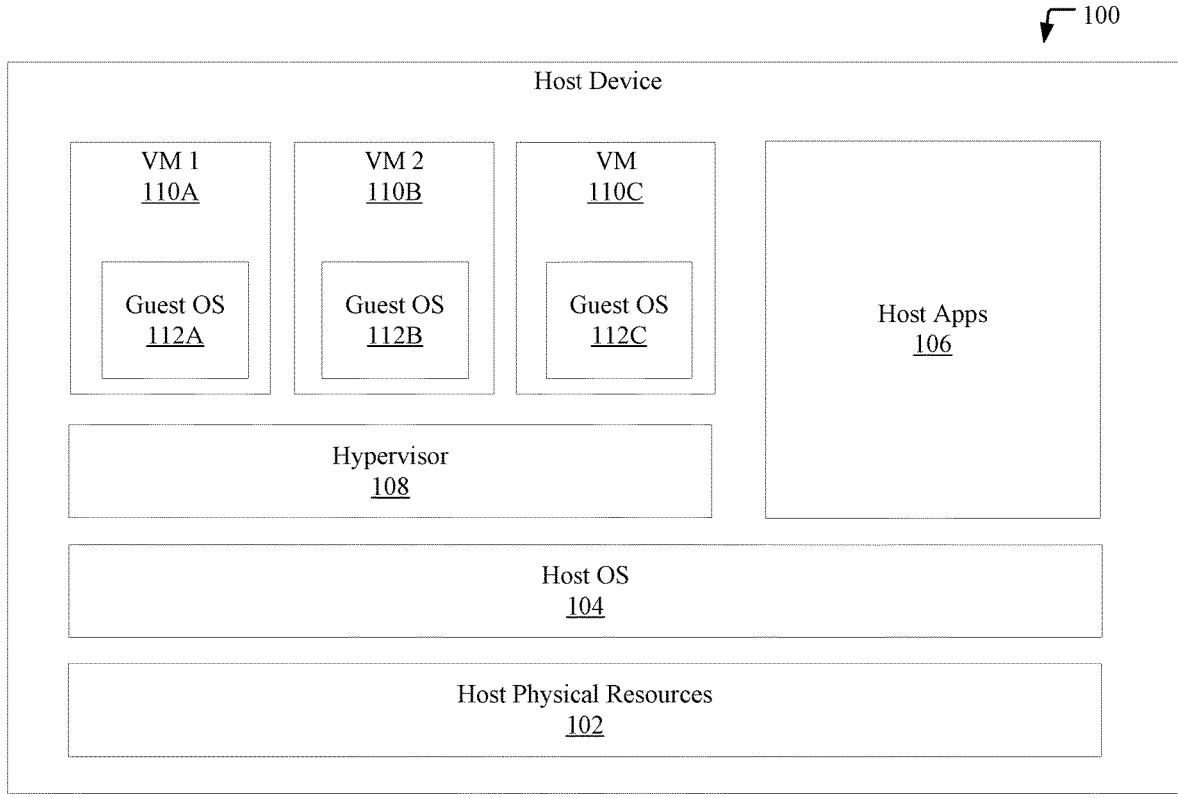
FIG. 1 illustrates an overview of an example host device for TSS and TSS/RSS alignment.

Receive side scaling (RSS) is a network driver technology that enables the efficient distribution of network-received data packets in multiprocessor systems. RSS enables an operating system (OS) to specify to a network interface card (NIC) the manner in which data packets received by the NIC are to be distributed among the central processing units (CPUs) of the operating system. RSS ensures that data packets in the same data flow are provided to the same CPU for processing, thereby preventing data packets from being delivered to and processed by CPUs out of sequence.

Currently, there is no transmit side scaling (TSS) mechanism in which the NIC specifies to the OS the manner in which data packets transmitted by the OS are to be distributed to the NIC. Instead, the OS randomly assigns data packets to the transmit queues of the NIC and the NIC multiplexes and requeues the data packets on different transmit queues as necessary. A transmit queue, as used herein, is a data structure implemented in a NIC and used to sequentially transmit data packets from the NIC to a destination. The requeuing of data packets causes processing latency, additional memory consumption, and increases data packet drops (e.g., lost or failed data packet transmissions).

Additionally, there is currently no mechanism for aligning RSS and TSS to enable data packets received via RSS to be transmitted in accordance with a TSS configuration. Instead, even if a TSS mechanism was implemented by an OS, the CPUs specified by the OS to receive the data packets from the NIC may not process the same data packet types as the transmission queues associated with the CPUs. For example, RSS may be used to specify that CPU 1 of an OS is to be used to receive a certain type of data packet. TSS may be used to specify that transmit queue 3 of the OS's NIC is to be used to transmit the certain type of data packet. If CPU 1 is not aligned to transmit queue 3 (e.g., if CPU 1 is aligned to transmit queue 1 and CPU 3 is aligned to transmit queue 3), it may be necessary for the NIC to requeue the data packet when the data packet is received from the OS.

Accordingly, the present disclosure describes systems and methods for providing a TSS solution. In examples, TSS configuration information is received by a host OS from an alternative OS (e.g., a guest OS or the OS of a remote computing device or computing system). The TSS configuration information specifies the manner in which data packets transmitted by the host OS are to be distributed to a NIC of the host OS such that the NIC transmits the data packet to the alternative OS in a particular manner. For example, a guest OS may specify that certain data packets are transmitted to a particular virtual CPU of the guest OS. The TSS configuration information includes data packet information and transmit queue information. In examples, the data packet information relates to a type of data packet (e.g., raw Internet protocol (IP), Internet control message protocol (ICMP), user datagram protocol (UDP), transmission control protocol (TCP)) and/or one or more header fields of a data packet (e.g., IP version, source IP address, destination IP address, time-to-live, network traffic class, flow label, payload length). The transmit queue information comprises transmit queue identifiers (e.g., a queue number or queue label).

The TSS configuration information is implemented in an outbound transmission data structure of the host OS, such as a data table, an index, or a list (collectively referred to herein as "outbound transmission table"). In some examples, TSS configuration information is implemented in a NIC of the host OS. The NIC may be a physical NIC or a virtual NIC. In other examples, the TSS configuration information is not implemented in a NIC. Implementing the TSS configuration information comprises applying a hash function to the data packet information to compute hash values. The hash values and the transmit queue information are stored in an outbound transmission table. In one example, only a portion of the hash value, such as the least significant bits of the hash value, is stored with the transmit queue information. In some examples, a hash function is not applied to the data packet information and the un-hashed data packet information is stored along with the transmit queue information in the outbound transmission table.

When a data packet intended for the alternative OS is received by the host OS or generated by the host OS, the host OS evaluates the data packet using the outbound transmission table. As part of the evaluation, the host OS performs a lookup of the data packet information of the data packet using a data structure that maps data packet information to hash values, such as a lookup table. The hash value for the data packet is compared to the hash values in the outbound transmission table to determine a transmit queue to be used to transmit the data packet. In examples in which the outbound transmission table does not store hash values, the NIC compares the data packet information of the data packet to data packet information stored in the outbound transmission table. The NIC then transmits the data packet to the alternative OS using the determined transmit queue.

The present disclosure also provides systems and methods for aligning RSS and TSS. In examples, a host operating system constructs an inbound transmission data structure, such as a data table, an index, or a list (collectively referred to herein as "inbound transmission table"), that comprises RSS configuration information. The RSS configuration information specifies the manner in which data packets transmitted to the host OS are to be distributed to the CPUs of the host OS. For example, a host OS may specify that certain data packets are transmitted to a particular CPU of the host OS. The RSS configuration information includes data packet information, as described above, and CPU information. The CPU information comprises CPU identifiers (e.g., a CPU number or CPU label).

The host OS constructs the inbound transmission table such that the RSS configuration information is aligned to TSS configuration information stored by the host OS. As one example, the RSS configuration information may specify that a certain data packet type is to be transmitted to a particular physical CPU of the host OS. The TSS configuration information may specify that the certain data packet type is to be transmitted to a particular virtual CPU of a guest OS using a particular transmit queue of the host OS's NIC. Accordingly, the host OS constructs the inbound transmission table such that the CPU for receiving the certain data packet type is aligned with the transmit queue for transmitting the certain data packet type. In examples, aligning RSS configuration information to TSS configuration information comprises storing a mapping of CPUs of the host OS to transmit queues of the NIC.

The host OS provides the inbound transmission table to a NIC of the host OS. The NIC may be a physical NIC or a virtual NIC. The NIC implements the inbound transmission table. Implementing the inbound transmission table may comprise applying a hash function to the data packet information within the inbound transmission table, as described above.

When a data packet intended for an alternative OS accessible to the host OS is received by the NIC, the NIC evaluates the data packet using the inbound transmission table. The evaluation may comprise computing a hash value for the data packet information or performing a lookup of the data packet information, as described above. Based on the evaluation, the NIC transmits the data packet to a specified CPU of the host OS. The specified CPU transmits the data packet to a transmit queue aligned to the specified CPU. The NIC (or a different NIC of the host OS) then transmits the data packet to the alternative OS using the determined transmit queue. Thus, the host OS does not need to requeue the data packet in order to transmit the data packet to the alternative OS.

Accordingly, the present disclosure provides a plurality of technical benefits and improvements over previous data transmission solutions. These technical benefits and improvements include: providing a TSS mechanism to specify the manner in which data packets transmitted by a host OS are to be distributed to transmit queues of the NIC, aligning RSS and TSS configurations to prevent unintentional requeuing of data packets, and reducing processing latency, memory consumption, and packet drops during transmission, among others.

FIG. 1 illustrates a host device for TSS and aligning RSS and TSS. Example host device 100 as presented is a combination of interdependent components that interact to form an integrated whole. Components of host device 100 may be hardware components or software components (e.g., applications, application programming interfaces (APIs), modules, VMs, or runtime libraries) implemented on and/or executed by hardware components of host device 100. In one example, components of host device 100 are distributed across multiple processing devices.

In FIG. 1, host device 100 comprises host physical resources 102, host OS 104, host applications 106, hypervisor 108, and VMs 110A, 110B, and 110C (collectively referred to as "VM(s) 110"). The scale and structure of devices, environments, and systems discussed herein may vary and may include additional or fewer components than those described in FIG. 1 and subsequent figures. Further, although examples in FIG. 1 and subsequent figures will be discussed in the context of VMs, the examples are equally applicable to other contexts, such as those that do not implement virtual environments or virtual components. Examples of host device 100 include personal computers (PCs), server devices, mobile devices (e.g., smartphones, tablets, laptops, personal digital assistants (PDAs)), wearable devices (e.g., smart watches, smart eyewear, fitness trackers, smart clothing, body-mounted devices, head-mounted displays), gaming consoles or devices, and Internet of Things (IoT) devices.

Host physical resources 102 include processing hardware (e.g., a central processing unit (CPU), a graphics processing unit (GPU), a video card), memory, persistent storage, network interfaces (e.g., physical NICs and virtual NICs), and the like. In examples, host physical resources 102 are directly accessible by host OS 104, host applications 106, and hypervisor 108, and are not directly accessible by VM(s) 110. Instead, VM(s) 110 indirectly access host physical resources 102 via a component of host device 100, such as hypervisor 108.

Host OS 104 provides software for performing various computing functions, such as executing host applications 106, executing hypervisor 108, scheduling tasks, and controlling peripherals (e.g., microphones, touch-based sensors, geolocation sensors, accelerometers, optical/magnetic sensors, gyroscopes, keyboards, and pointing/selection tools). Host OS 104 is configured to receive input data (e.g., audio input, touch input, text-based input, gesture input, and/or image input) from a user or a computing device. In some examples, the input data corresponds to user interaction with host applications 106 or hypervisor 108. In other examples, the input data corresponds to automated interaction with services or host applications 106, such as the automatic (e.g., non-manual) execution of scripts or sets of commands at scheduled times or in response to predetermined events.

Host applications 106 may be implemented locally on host device 100 or accessible remotely by host device 100 via a network, such as a private area network (PAN), a local area network (LAN), a wide area network (WAN), and the like. Host applications 106 provide access to a set of software and/or hardware functionality. Examples of host applications 106 include applications and services relating to word processing, spreadsheets, presentation software, document-reading, social media software or platforms, search engines, media software or platforms, multimedia players, content design software or tools, database software or tools, provisioning software, and alert or notification software.

Hypervisor 108 is software that creates, executes, and manages VM(s) 110 within an execution environment of host device 100. Hypervisor 108 exposes VM(s) 110 to one or more networks in order to enable VM(s) 110 to communicate amongst each other and to communicate with other devices or components of or external to host device 100. In examples, hypervisor 108 provides VM(s) 110 access to host physical resources 102 and/or the physical resources of computing devices external to host device 100.

VM(s) 110 are compute resources that use software instead of a physical computing device to execute and deploy applications. VM(s) 110 comprise guest OS 112A, 112B, and 112C (collectively referred to as "guest OS 112"). Each guest OS 112 comprises a kernel space and a user space. The kernel space is reserved for executing a privileged OS kernel, kernel extensions, and most device drivers. The user space is reserved for executing application software and non-privileged device drivers. In examples, guest OS 112 implements or has access to applications, such as described with respect to host applications 106. Each guest OS 112 may comprise or provide access to a different set of applications. A set, as used herein, may comprise one or more items.

Figure 2A:
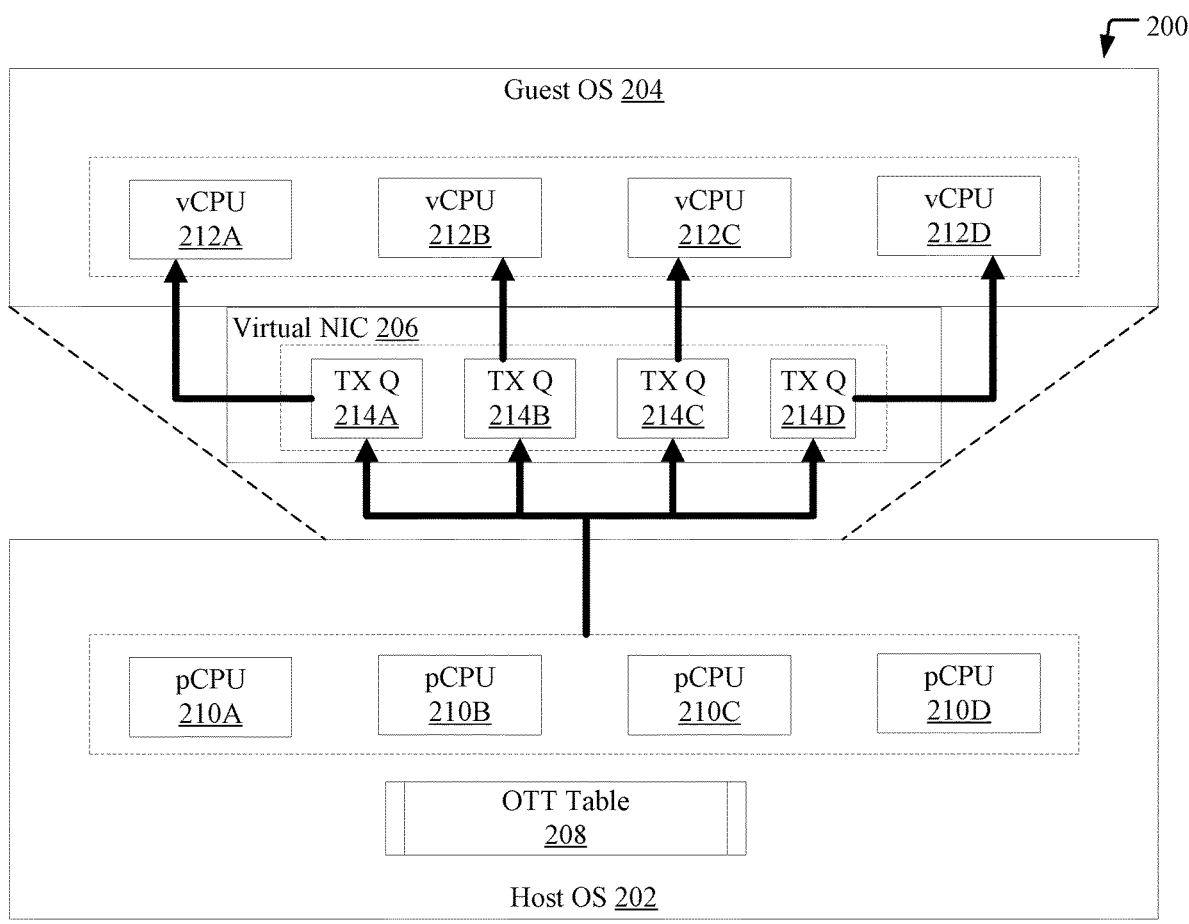
FIGS. 2A and 2B illustrate an example computing environment for implementing TSS.
Figure 2B:
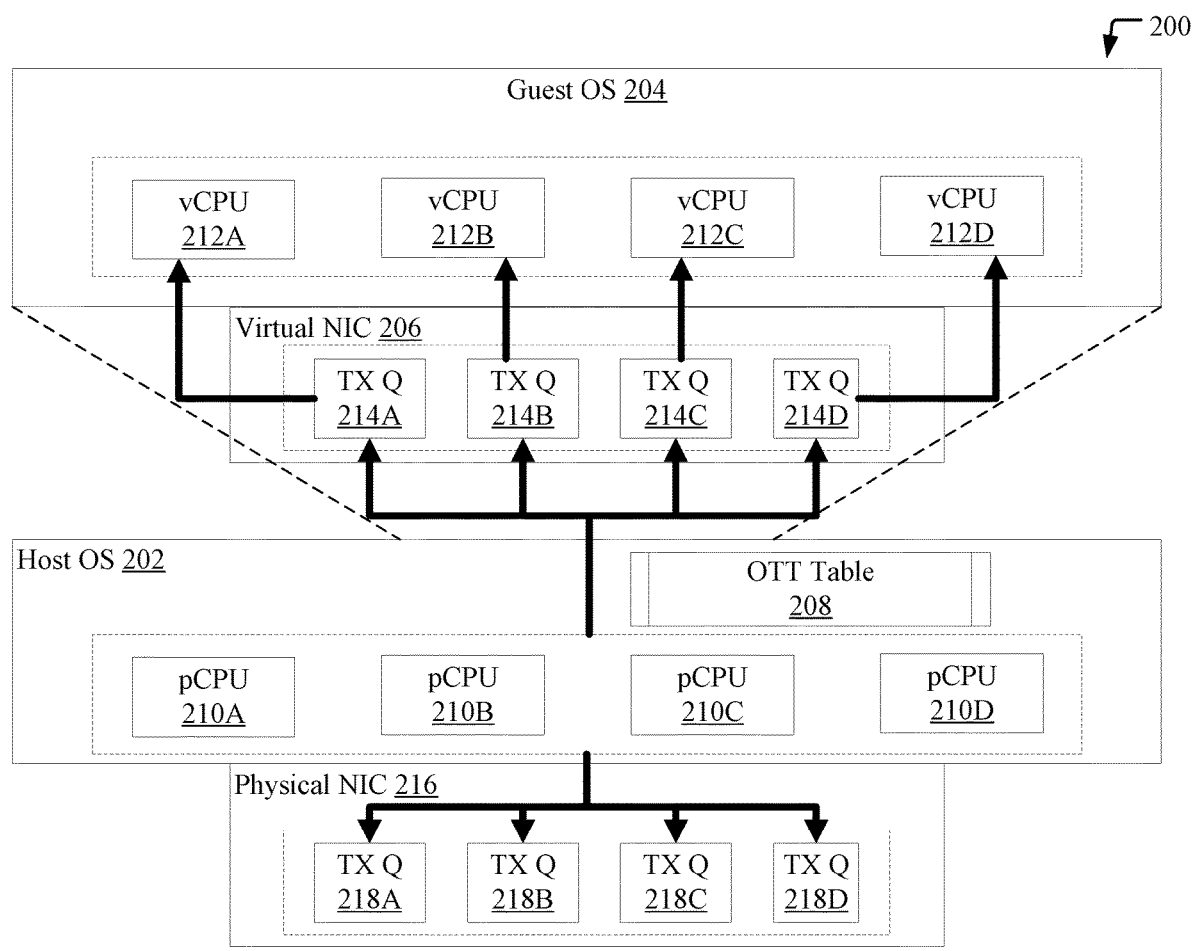
Figure 3:
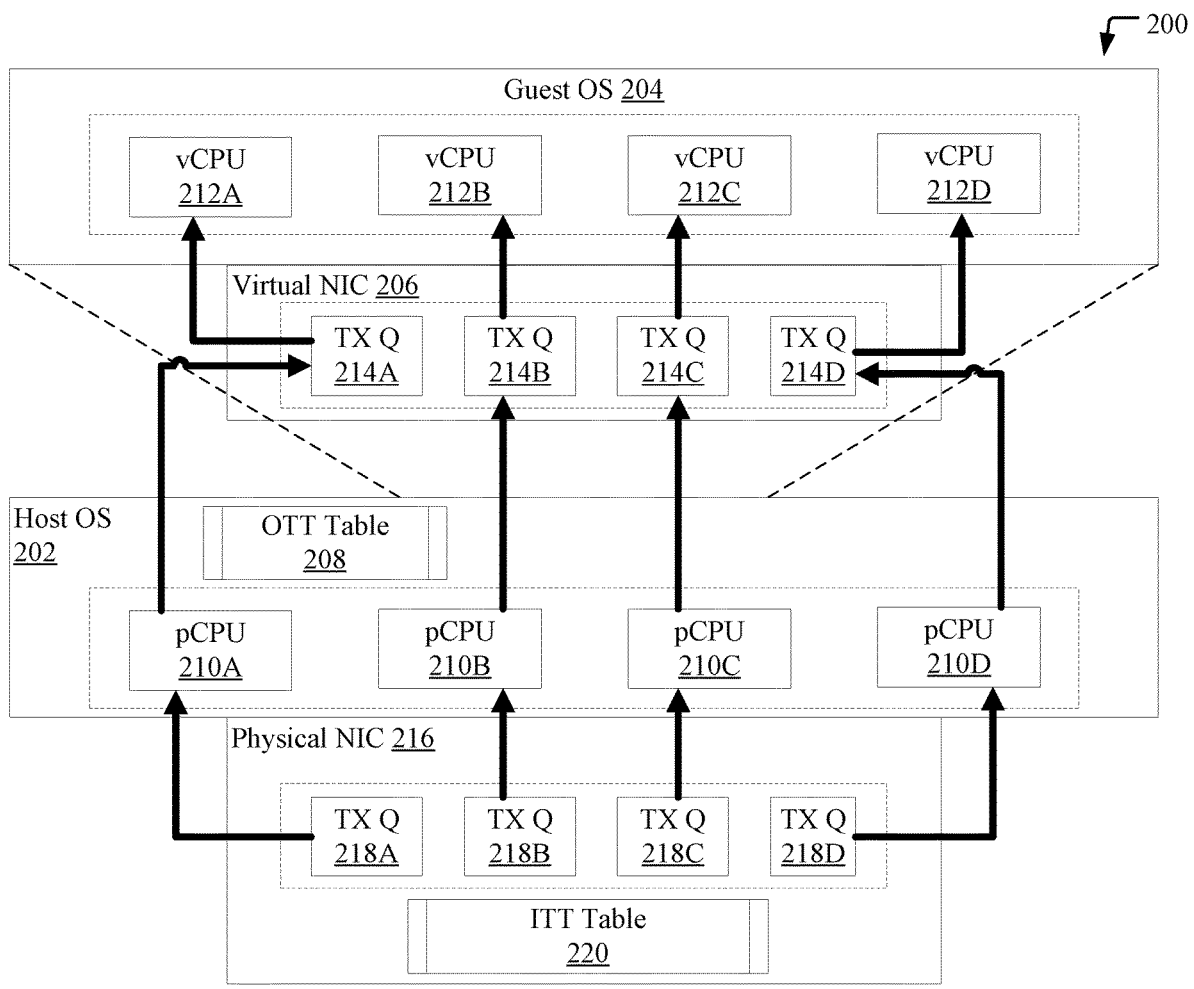
FIG. 3 illustrates an example computing environment for aligning RSS and TSS.

FIGS. 2A, 2B, and 3 illustrate a computing environment for implementing TSS and aligning RSS and TSS. In examples, the computing environment is implemented in a computing device, such as host device 100. However, alternative implementations of the computing environment are contemplated.

FIG. 2A illustrates a computing environment implementing TSS. Example computing environment 200 comprises host OS 202. Host OS 202 comprises guest OS 204, virtual NIC 206, outbound transmission table (OTT) 208, and physical CPUs 210A-D. Guest OS 204 comprises virtual CPUs 212A-D. A virtual CPU represents a portion or share of a physical CPU that is assigned to a guest OS. Each of virtual CPUs 212A-D may be configured to receive and process one or more data packet types. Virtual NIC 206 comprises transmit queues (TX Q) 214A-D. Transmit queues 214A-D transmit data packets to/from host OS 202 and guest OS 204.

In FIG. 2A, guest OS 204 is configured such that each of virtual CPUs 212A-D is configured to process a certain data packet type. For example, virtual CPU 212A processes a first packet data type, virtual CPU 212B processes a second packet data type, and so on. To prevent requeuing of data packets received by virtual NIC 206 and intended for guest OS 204, each of virtual CPUs 212A-D is aligned to a respective one of transmit queues 214A-D such that data packets transmitted using a transmit queue are provided directly to the virtual CPU aligned to the transmit queue. For example, transmit queue 214A is aligned to virtual CPU 212A, transmit queue 214B is aligned to virtual CPU 212B, transmit queue 214C is aligned to virtual CPU 212C, and transmit queue 214D is aligned to virtual CPU 212D.

Outbound transmission table 208 comprises TSS configuration information received from guest OS 204. The TSS configuration information specifies the manner in which data packets transmitted by physical CPUs 210A-D to guest OS 204 are to be distributed to transmit queues 214A-D. As one example, outbound transmission table 208 specifies that a first data packet type is to be transmitted to transmit queue 214A, a second data packet type is to be transmitted to transmit queue 214B, a third data packet type is to be transmitted to transmit queues 214C, and a fourth data packet type is to be transmitted to transmit queues 214D. In some examples, multiple data packet types may be transmitted to each of transmit queues 214A-D and the same data packet type may be transmitted to two or more of transmit queues 214A-D.

In some examples, outbound transmission table 208 comprises TSS configuration information for multiple NICs. For example, in FIG. 2B, computing environment 200 further comprises physical NIC 216. Physical NIC 216 comprises transmit queues 218A-D. Outbound transmission table 208 comprises TSS configuration information for virtual NIC 206 and physical NIC 216. The TSS configuration information for the physical NIC specifies the manner in which data packets transmitted by physical CPUs 210A-D to a remote computing device or computing system are to be distributed to transmit queues 218A-D.

FIG. 3 illustrates a computing environment implementing alignment of RSS and TSS. In FIG. 3, physical NIC 216 further comprises inbound transmission table 220. Inbound transmission table (ITT) 220 comprises RSS configuration information received from host OS 202. The RSS configuration information specifies the manner in which data packets received by host OS 202 are to be distributed to physical CPUs 210A-D. As one example, inbound transmission table 220 specifies that a first data packet type is to be transmitted to physical CPU 210A using transmit queue 218A, a second data packet type is to be transmitted to physical CPU 210B using transmit queue 218B, a third data packet type is to be transmitted to physical CPU 210C using transmit queue 218C, and a fourth data packet type is to be transmitted to physical CPU 210D using transmit queue 218D. In some examples, multiple data packet types may be transmitted to each of physical CPUs 210A-D and the same data packet type may be transmitted to two or more of physical CPUs 210A-D.

In FIG. 3, host OS 202 is configured such that the RSS configuration information in inbound transmission table 220 is aligned with the TSS configuration information in outbound transmission table 208. Continuing from the above example, physical CPU 210A is aligned to transmit queue 214A, physical CPU 210B is aligned to transmit queue 214B, physical CPU 210C is aligned to transmit queue 214C, and physical CPU 210D is aligned to transmit queue 214D. Accordingly, data packets received by physical NIC 216 can be transmitted between physical CPUs 210A-D and virtual CPUs 212A-D such that the data packet need not be requeued to be sent to a different one of physical CPUs 210A-D or to a different one of virtual CPUs 212A-D.

Having described one or more devices and systems that may employ aspects of the present disclosure, methods for performing these aspects will now be described. In examples, methods 400 and 500 may be executed by a device, such as host device 100, or a computing environment, such as computing environment 200 of FIGS. 2A, 2B, and 3. However, methods 400 and 500 are not limited to such examples.

Figure 4:
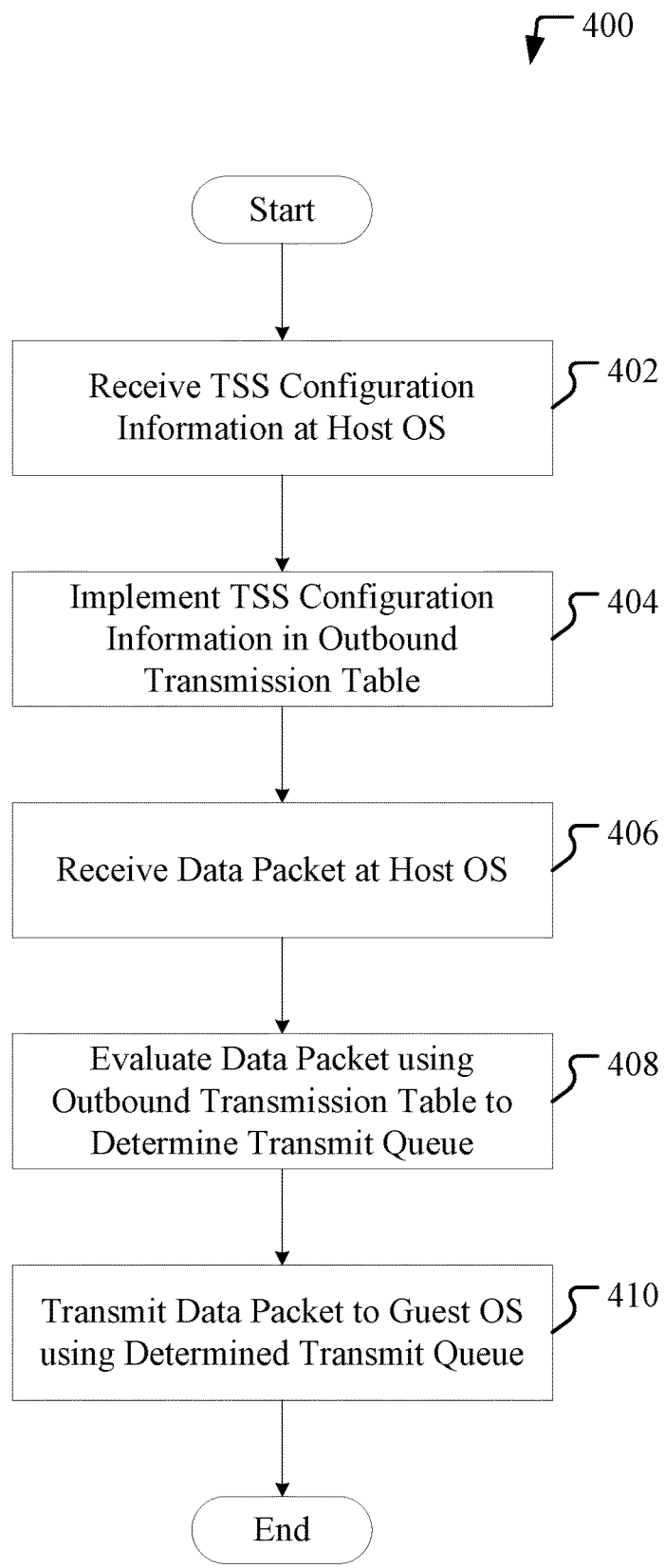
FIG. 4 illustrates an example method for providing a TSS solution.

FIG. 4 illustrates an example method for providing a TSS solution. Example method 400 begins at operation 402, where TSS configuration information is received by a host OS, such as host OS 202. The TSS configuration information may be provided by a guest OS, such as guest OS 204, or by an alternative OS of a remote computing device or computing system. The TSS configuration information specifies the manner in which data packets transmitted by the host OS are to be distributed to a NIC of the host OS, such as virtual NIC 206 or physical NIC 216. In one example, the TSS configuration information specifies data packet types (e.g., raw IP, ICMP, UDP, TCP) to be distributed to each transmit queue of the NIC. Alternatively, the TSS configuration information may specify data packet header fields to be used to distribute data packets to each transmit queue of the NIC.

At operation 404, the TSS configuration information is implemented in an outbound transmission table, such as outbound transmission table 208. In examples, implementing the TSS configuration information comprises applying a hash function to data packet header fields or other data packet information to compute hash values. The hash values (or a portion thereof) and transmit queue information are stored in the outbound transmission table such that the hash values are correlated to specific transmit queues of a NIC, such as transmit queues 214A-D and 218A-D. As a specific example, a hash value for raw IP data packets is correlated to (e.g., mapped to) transmit queue 1 of a virtual NIC, a hash value for ICMP data packets is correlated to transmit queue 2 of the virtual NIC, and so on.

At operation 406, a data packet is received by the host OS. The data packet may be intended for the guest OS and may be generated by the host OS are received via the NIC. In examples, the data packet is received by a physical CPU of the host OS, such as physical CPUs 210A-D. The data packet is of a data packet type and comprises data packet information, such as a header section and a body section. The header section comprises header fields and the body section comprises a payload (e.g., the part of the data packet that is intended as the actual message).

At operation 408, the data packet is evaluated using the outbound transmission table. In examples, evaluating the data packet comprises providing, by the host OS, the data packet to the NIC. The NIC computes a hash value for the data packet information of the data packet or performs a lookup of the data packet information using a data structure that maps data packet information to hash values, such as a lookup table. The hash value for the data packet is compared to the hash values in the outbound transmission table to determine a transmit queue to be used to transmit the data packet to the guest OS. In at least one example, the outbound transmission table comprises data packet information, instead of or in addition to, hash values for the data packet information. In such an example, evaluating the outbound transmission table comprises performing a lookup of the data packet information of the data packet, as described above.

At operation 410, the data packet is transmitted to the guest OS using the determined transmit queue. In examples, the determined transmit queue is aligned to a virtual CPU of the guest OS, such as one or more of virtual CPUs 212A-D. Each virtual CPU may be configured to process a specific data packet type, in accordance with the TSS configuration information provided to the host OS by the guest OS. As a specific example, a first virtual CPU is configured to receive raw IP data packets, a second virtual CPU is configured to receive ICMP data packets, and so on.

Figure 5:
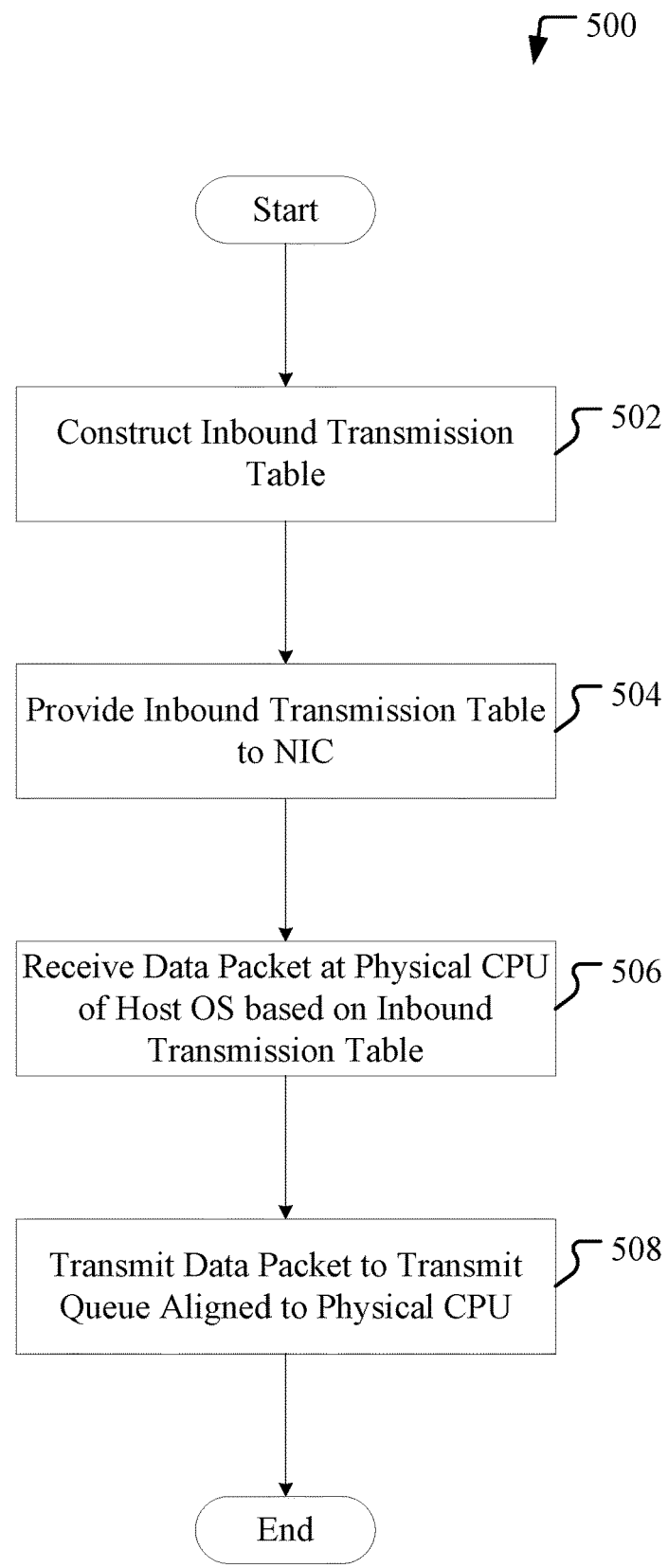
FIG. 5 illustrates an example method for aligning RSS and TSS.

FIG. 5 illustrates an example method for aligning RSS and TSS. Example method 500 begins at operation 502, where a host OS, such as host OS 202, constructs an inbound transmission table, such as inbound transmission table 220. The inbound transmission table is constructed based on RSS configuration information for the host OS and TSS configuration information provided by a guest OS, such as guest OS 204, or by an alternative OS of a remote computing device or computing system. The RSS configuration information specifies the manner in which data packets transmitted to the host OS are to be distributed to the CPUs of the host OS, whereas the TSS configuration information specifies the manner in which data packets transmitted by the host OS are to be distributed to a NIC of the host OS.

The host OS constructs the inbound transmission table such that the RSS configuration information is aligned to TSS configuration information. As one example, the TSS configuration information may specify that a certain data packet type (e.g., raw IP, ICMP, UDP, TCP) is to be transmitted to a particular virtual CPU of a guest OS using a particular transmit queue of a NIC, such as virtual NIC 206 or physical NIC 216. The RSS configuration information may specify that the certain data packet type is to be received by to a particular physical CPU of the hot OS, such as physical CPUs 210A-D. Accordingly, the host OS constructs the inbound transmission table such that the particular physical CPU is aligned to the particular transmit queue of the NIC. In some examples, inbound transmission table stores a mapping of physical CPUs to transmit queues.

At operation 504, the host OS provides the inbound transmission table to the NIC. The NIC may store the inbound transmission table as a new data table. Alternatively, the NIC may use the inbound transmission table to update an existing table. As one example, the NIC may comprise a data table including previously received RSS configuration information. The data table may be an indirection table that represents a mapping between hash values and transmit queue information. The indirection table may be indexed using a number of least significant bits of a set of hash values corresponding to data packet information. In such an example, the NIC updates the mappings in the indirection table with the correlations/mappings in the inbound transmission table.

At operation 506, physical CPU of the host OS receives a data packet based on the inbound transmission table. The data packet may be intended for the guest OS and may be received via the NIC. The data packet is of a data packet type comprises data packet information, as described with respect to operation 406 of FIG. 4.

At operation 508, the data packet is transmitted to a transmit queue aligned to the physical CPU. In examples, the transmit queue is aligned to the physical CPU in accordance with the inbound transmission table. As a specific example, the transmit queue and the physical CPU are both configured to receive and transmit the same data packet type (e.g., the data packet type of the received data packet). Accordingly, the physical CPU transmits the data packet to the transmit queue and the transmit queue transmits the data packet to a virtual CPU of the guest OS, where the virtual CPU is configured to receive and transmit the data packet type of the received data packet.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration, and, as is understood, a vast number of computing device configurations may be utilized for practicing aspects of the disclosure, described herein.

Figure 6:
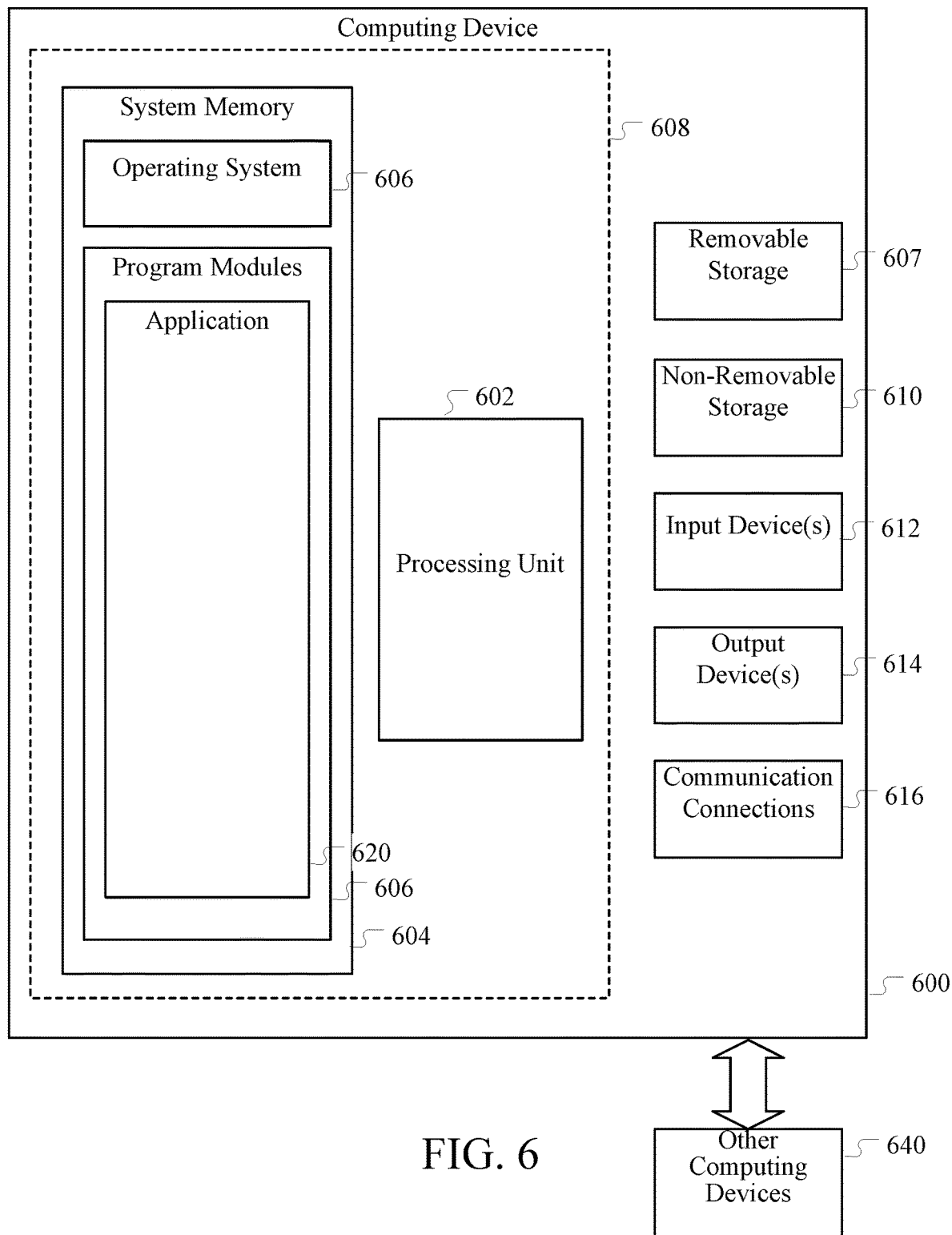
FIG. 6 is a block diagram illustrating example physical components of a computing device for practicing aspects of the disclosure.

FIG. 6 is a block diagram illustrating physical components (e.g., hardware) of a computing device 600 with which aspects of the disclosure may be practiced. The computing device components described below are suitable for the computing devices and systems described above. In a basic configuration, the computing device 600 includes a processing system 602 comprising at least one processing unit and a system memory 604. Depending on the configuration and type of computing device, the system memory 604 may comprise volatile storage (e.g., random access memory), non-volatile storage (e.g., read-only memory), flash memory, or any combination of such memories.

The system memory 604 includes an operating system 605 and one or more program modules 606 suitable for running software application 620, such as one or more components supported by the systems described herein. The operating system 605, for example, is suitable for controlling the operation of the computing device 600.

Furthermore, embodiments of the disclosure may be practiced in conjunction with a graphics library, other operating systems, or any other application program. This basic configuration is illustrated in FIG. 6 by those components within a dashed line 608. The computing device 600 may have additional features or functionality. For example, the computing device 600 may include additional data storage devices (removable and/or non-removable) such as, for example, magnetic disks, optical disks, tape, and other computer readable media. Such additional storage is illustrated in FIG. 6 by a removable storage device 607 and a non-removable storage device 610.

The term computer readable media as used herein includes computer storage media. Computer storage media includes volatile and nonvolatile, removable and non-removable media implemented in any method or technology for storage of information, such as computer readable instructions, data structures, or program modules. The system memory 604, the removable storage device 607, and the non-removable storage device 610 are all computer storage media examples (e.g., memory storage). Computer storage media includes random access memory (RAM), read-only memory (ROM), electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" describes a signal that has one or more characteristics set or changed in such a manner as to encode information in the signal. By way of example, communication media includes wired media such as a wired network or direct-wired connection, and wireless media such as acoustic, RF, infrared, and other wireless media.

As stated above, a number of program modules and data files may be stored in the system memory 604. While executing on the processing system 602, the program modules 606 (e.g., application 620) perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 are integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. Output device(s) 614 such as a display, speakers, a printer, etc. may also be included. The aforementioned devices are examples and others may be used. The computing device 600 includes one or more communication connections 616 allowing communications with other computing devices 640. Examples of suitable communication connections 616 include radio frequency (RF) transmitter, receiver, and/or transceiver circuitry; universal serial bus (USB), parallel, and/or serial ports.

Figure 7A:
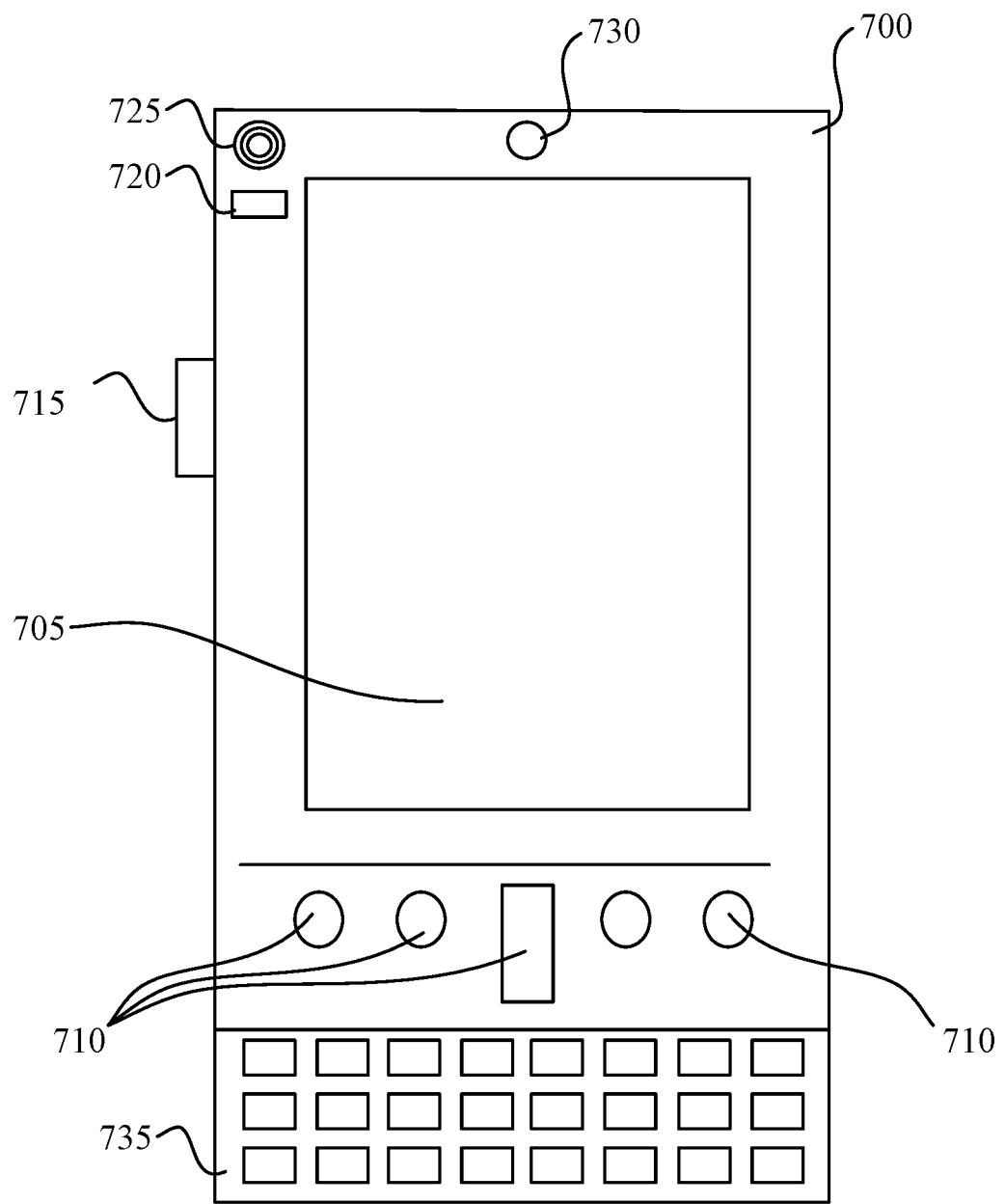
FIGS. 7A and 7B are simplified block diagrams of an example mobile computing device for practicing aspects of the present disclosure.
Figure 7B:
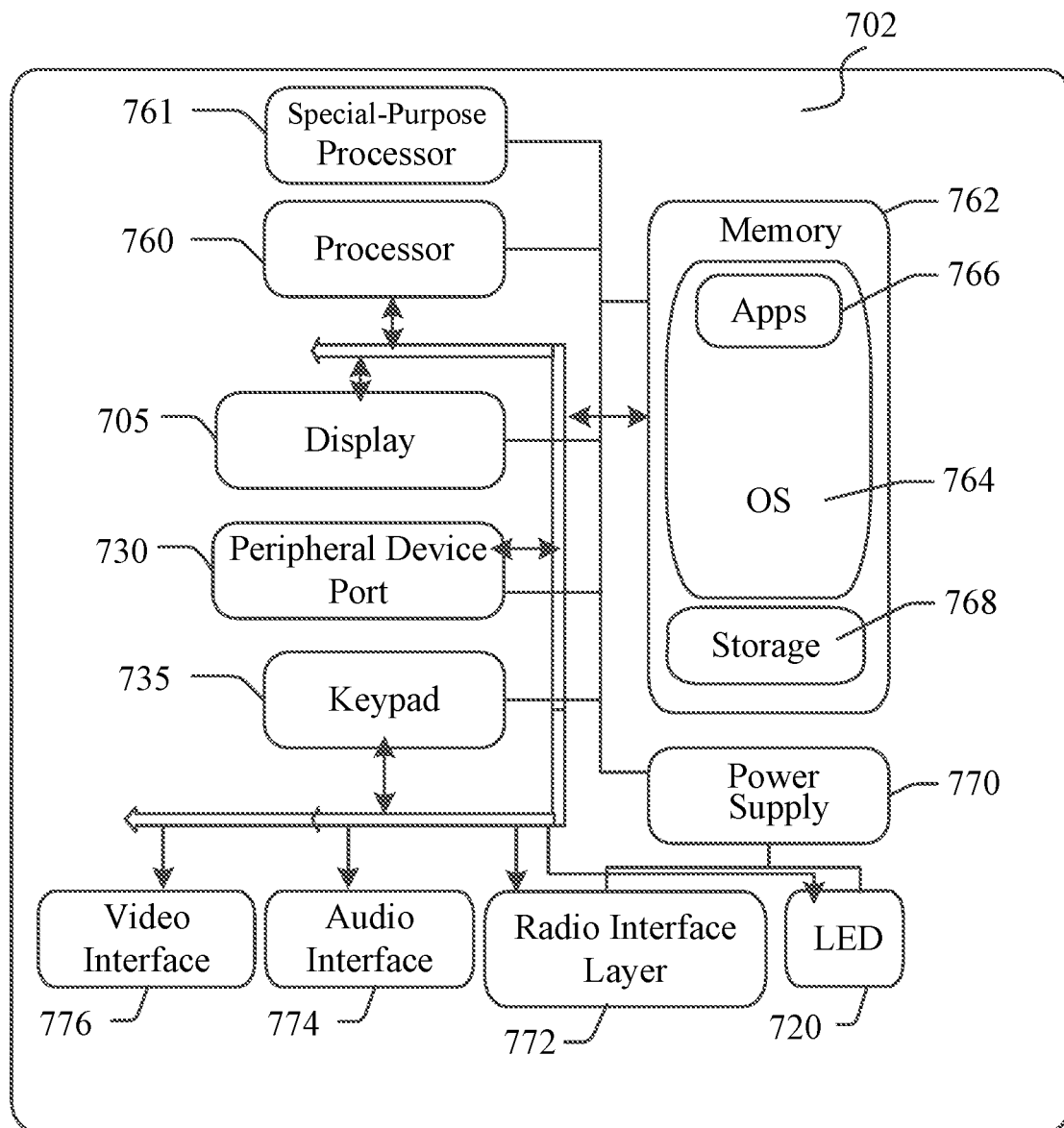

FIGS. 7A and 7B illustrate a mobile computing device 700, for example, a mobile telephone (e.g., a smart phone), wearable computer (such as a smart watch), a tablet computer, a laptop computer, and the like, with which embodiments of the disclosure may be practiced. In some aspects, the client device is a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 incorporates more or less input elements. For example, the display 705 may not be a touch screen in some embodiments.

In yet another alternative embodiment, the mobile computing device 700 is a mobile telephone, such as a cellular phone. The mobile computing device 700 may also include an optional keypad 735. Optional keypad 735 is a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system (OS) 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 is used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device described herein (e.g., search engine, extractor module, relevancy ranking module, answer scoring module).

The system 702 has a power supply 770, which may be implemented as one or more batteries. The power supply 770 might further include an external power source, such as an AC adapter or a powered docking cradle that supplements or recharges the batteries.

The system 702 also includes a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 are disseminated to the application programs 766 via the OS 764, and vice versa.

The visual indicator (e.g., light emitting diode (LED) 720) is used to provide visual notifications, and/or an audio interface 774 is used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor(s) (e.g., processor 760 and/or special-purpose processor 761) and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone also serves as an audio sensor to facilitate control of notifications, as will be described below. The system 702 further includes a video interface 776 that enables an operation of a peripheral device port 730 (e.g., an on-board camera) to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data may be readily transferred between computing devices for storage and use according to well-known data transfer and storage means, including electronic mail and collaborative data sharing systems.

Figure 8:
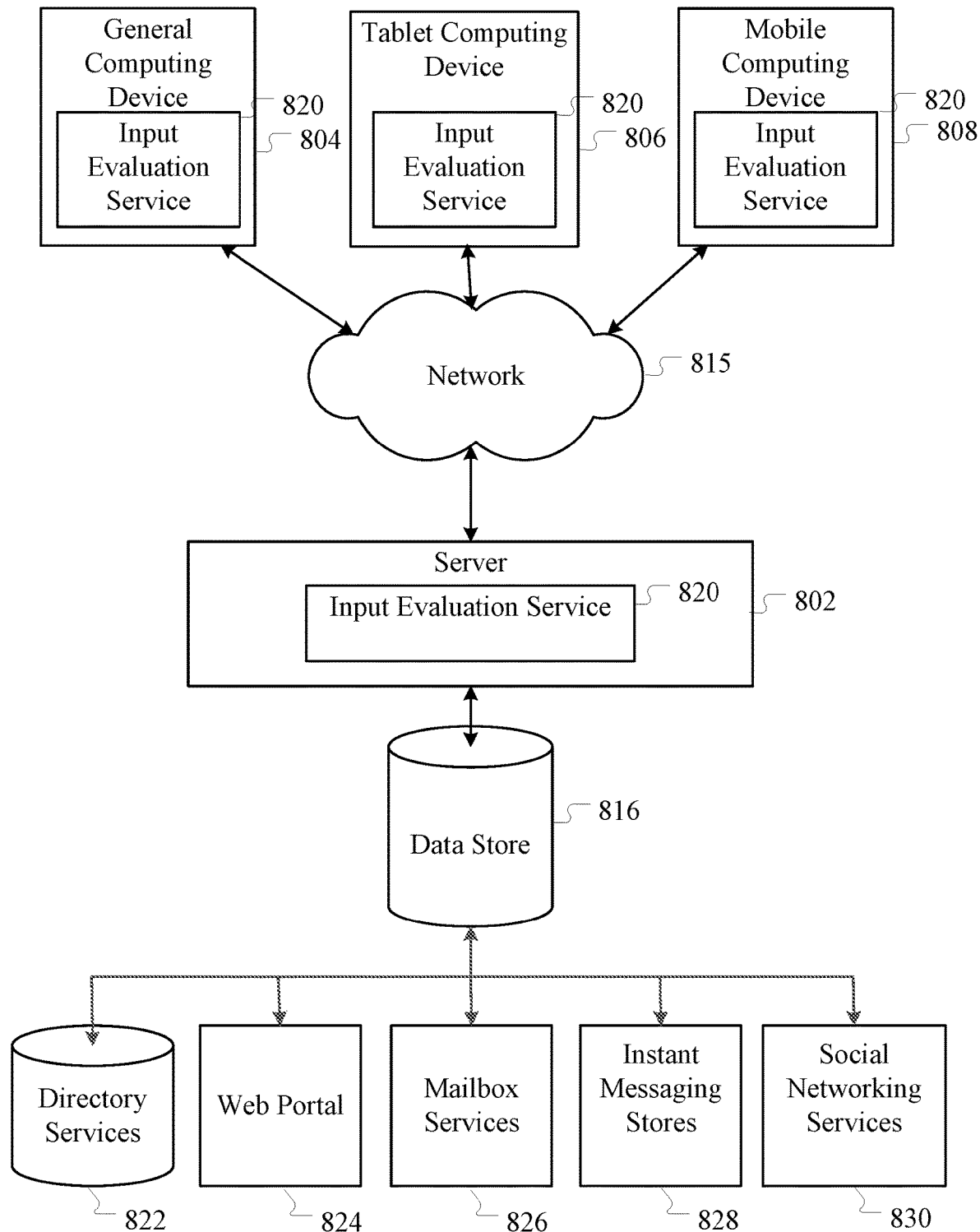
FIG. 8 is a simplified block diagram of an example distributed computing system for practicing aspects of the present disclosure.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using directory services 822, web portals 824, mailbox services 826, instant messaging stores 828, or social networking services 830.

An input evaluation service 820 may be employed by a client that communicates with server device 802, and/or input evaluation service 820 may be employed by server device 802. The server device 802 provides data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the data store 816, in addition to receiving graphical data useable to be either pre-processed at a graphic-originating system, or post-processed at a receiving computing system.

As will be understood from the foregoing disclosure, one example of the technology relates to a computer-implemented method. The method comprises: receiving, at a host operating system (OS), a guest transmission configuration from a guest OS; implementing, at the host OS, the guest transmission configuration in an outbound transmission table; receiving a data packet at the host OS; determining a transmission queue for transmitting the data packet to the guest OS by evaluating the data packet using the outbound transmission table; and transmitting the data packet to the guest OS using the transmission queue.

In another example, the technology relates to as alternative computer-implemented method. The method comprises: constructing, by a host operating system (OS), an inbound transmission table that comprises a mapping of data packet types to a set of processors of the host OS; providing the inbound transmission table to a network interface card (NIC); receiving, at a processor of the set of processors, a data packet based on the mapping; and transmitting the data packet to a transmission queue associated with a guest operating system (OS), wherein the processor is aligned to the transmission queue.

In another example, the technology relates to a system comprising: a processor system; and memory coupled to the processor system, the memory comprising computer executable instructions that, when executed by the processor system, perform operations comprising: receiving, at a host operating system (OS), a transmit side scaling (TSS) transmission configuration from a guest OS; implementing, at the host OS, the TSS transmission configuration in an outbound transmission table; receiving a data packet at the host OS, wherein the data packet is intended for the guest OS; determining a transmission queue correlated to header data stored in an outbound transmission table by matching header data associated with the data packet with the header data stored in the outbound transmission table; and transmitting the data packet to the guest OS using the transmission queue.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method comprising:
    receiving, at a host operating system (OS), a guest transmission configuration from a guest OS;
    implementing, at the host OS, the guest transmission configuration in an outbound transmission table;
    receiving a data packet at the host OS;
    determining a transmission queue for transmitting the data packet to the guest OS by evaluating the data packet using the outbound transmission table; and
    transmitting the data packet to the guest OS using the transmission queue.

2. The method of claim 1, wherein the guest transmission configuration comprises data packet information that is associated with data packet type.

3. The method of claim 2, wherein the guest transmission configuration further comprises a set of transmission queues for transmitting data packets to the guest OS.

4. The method of claim 3, wherein each transmission queue in the set of transmission queues is aligned to a processor of the guest OS.

5. The method of claim 3, wherein the data packet information associated with each data packet type is correlated to a corresponding transmission queue in the set of transmission queues.

6. The method of claim 5, wherein implementing the guest transmission configuration further comprises:
    creating a hash value for each data packet type; and
    storing each hash value and the corresponding transmission queue correlated to the hash value in the outbound transmission table such that the hash value is mapped to the corresponding transmission queue.

7. The method of claim 1, wherein receiving the data packet at the host OS comprises receiving the data packet via a physical network interface card of the host OS, wherein the data packet is intended for the guest OS.

8. The method of claim 1, wherein evaluating the data packet using the outbound transmission table comprises:
matching a hash value of the data packet to a hash value stored in the outbound transmission table;
identifying the transmission queue as being correlated to the hash value stored in the outbound transmission table; and
determining the transmission queue based on the transmission queue being correlated to the hash value.

9. The method of claim 8, wherein matching the hash value of the data packet to the hash value stored in the outbound transmission table comprises:
identifying a set of fields in a header of the data packet;
applying hashing function to the set of fields to generate the hash value.

10. The method of claim 1, wherein transmitting the data packet to the guest OS using the transmission queue comprises:
identifying a first processor in a set of processors of the guest OS, wherein the first processor is aligned with the transmission queue and a second processor in the set of processors of the guest OS is not aligned to the transmission queue; and
transmitting the data packet to the guest OS such that the data packet is provided to the first processor.

11. The method of claim 1, wherein the outbound transmission table is an indirection table.

12. The method of claim 11, wherein the indirection table is indexed using a number of least significant bits of a set of hash values.

13. The method of claim 1, wherein the guest transmission configuration is received from a virtual network interface card of the guest OS.

14. The method of claim 1, wherein the host OS is implemented in a host device comprising the guest OS, the guest OS corresponding to a virtual machine.

15. A method comprising:
constructing, by a host operating system (OS), an inbound transmission table that comprises a mapping of data packet types to a set of processors of the host OS;
providing the inbound transmission table to a network interface card (NIC);
receiving, at a processor of the set of processors, a data packet based on the mapping; and
transmitting the data packet to a transmission queue associated with a guest operating system (OS), wherein the processor is aligned to the transmission queue.

16. The method of claim 11, wherein constructing the inbound transmission table comprises:
creating a hash value for each of the data packet types;
correlating each hash value to a processor of the set of processors; and
storing each hash value and the processor correlated to the hash value in the inbound transmission table.

17. The method of claim 11, wherein:
the host OS comprises a set of transmission queues for transmitting data packets to the guest OS, the set of transmission queues comprising the transmission queue; and
each transmission queue of the set of transmission queues is aligned to a corresponding processor of the set of processors.

18. The method of claim 17, wherein each transmission queue of the set of transmission queues is further aligned to a corresponding processor of the guest OS.

19. The method of claim 17, wherein each transmission queue of the set of transmission queues is aligned to the corresponding processor of the set of processors based on an indirection table of the host device, the indirection table specifying a set of data packet types and a corresponding transmission queue of the set of transmission queues for transmitting data packets having a data packet type in the set of data packet types.

20. A system comprising:
a processor system; and
memory coupled to the processor system, the memory comprising computer executable instructions that, when executed by the processor system, perform operations comprising:
receiving, at a host operating system (OS), a transmit side scaling (TSS) transmission configuration from a guest OS;
implementing, at the host OS, the TSS transmission configuration in an outbound transmission table;
receiving a data packet at the host OS, wherein the data packet is intended for the guest OS;
determining a transmission queue correlated to header data stored in an outbound transmission table by matching header data associated with the data packet with the header data stored in the outbound transmission table; and
transmitting the data packet to the guest OS using the transmission queue.

* * * * *